United States Patent [19]

White

[11] Patent Number: 5,139,749

[45] Date of Patent: Aug. 18, 1992

[54] FLUIDIZED CALCINING PROCESS

[75] Inventor: Justin C. White, Magna, Utah

[73] Assignee: Tas, Inc., Magna, Utah

[21] Appl. No.: 542,325

[22] Filed: Jun. 22, 1990

[51] Int. Cl.$^5$ .......................... F26D 7/00; B01J 8/08; C04B 11/02; C01F 11/46

[52] U.S. Cl. ..................... 422/200; 422/232; 432/14; 432/58; 432/239; 423/171; 423/555; 34/86

[58] Field of Search ........ 423/171, DIG. 16, DIG. 6, 423/170, 555, 172, 659; 203/26; 34/86, 15; 422/200, 232; 432/14, 58, 239

[56] References Cited

U.S. PATENT DOCUMENTS

| | | | |
|---|---|---|---|
| 624,709 | 5/1899 | Van Hook | 423/171 |
| 2,170,745 | 8/1939 | Brush | 423/171 |
| 2,436,157 | 11/1948 | Westling | 423/DIG. 16 |
| 2,529,366 | 11/1950 | Bauer | 423/171 |
| 2,934,328 | 4/1960 | Zvejnieks | 423/171 |
| 2,974,939 | 3/1961 | Landrieu | 423/171 |
| 3,266,788 | 8/1966 | Jakkola | 423/DIG. 16 |
| 3,312,455 | 4/1967 | Chassevent et al. | 423/171 |
| 3,607,045 | 9/1971 | Wheelock | 423/541 |
| 3,716,095 | 12/1973 | Ritzmann et al. | 423/DIG. 16 |
| 3,865,602 | 2/1975 | Stich et al. | 106/765 |
| 4,005,987 | 2/1977 | Jury | 423/DIG. 16 |
| 4,008,994 | 2/1977 | Numasaki et al. | 204/124 |
| 4,076,796 | 2/1978 | Reh et al. | 423/DIG. 16 |
| 4,119,436 | 10/1978 | Bosnjak | 203/26 |
| 4,238,238 | 12/1980 | Kinkade et al. | 423/171 |
| 4,247,518 | 1/1981 | Charlet et al. | 423/171 |
| 4,461,675 | 7/1984 | Osterman et al. | 203/26 |
| 4,462,870 | 7/1984 | Wilson et al. | 432/102 |
| 4,514,912 | 5/1985 | Janusch et al. | 34/15 |
| 4,653,198 | 3/1987 | Alsaker | 34/86 |
| 5,011,668 | 4/1991 | Ball et al. | 423/171 |

OTHER PUBLICATIONS

Unit Processes and Principles of Chemical Engineering (p. 3 lines 1-2) by John C. Olsen, PhD., D. Sc. 1932.

Primary Examiner—Gary P. Straub
Attorney, Agent, or Firm—Trask, Britt & Rossa

[57] ABSTRACT

A method for enhancing the efficiency of a thermal process such as calcination. The incoming solid particulate material is preheated in the conveyor by partially cooled exhaust vapors from the thermal processor. In passage through the conveyor, the cooled, intermediate temperature vapors contact, fluidize and heat the particulate solids to increase the available throughput of the system.

1 Claim, 3 Drawing Sheets

FLUIDIZED CALCINING PROCESS

BACKGROUND OF THE INVENTION

1. Field

This invention relates to the field of chemical engineering, and particularly to the heating of chemical materials. More particularly, the invention pertains to calcination processes requiring heat transfer under temperature controlled conditions.

2. State of the Art

The thermal processing of various ores and other inorganic and organic materials often utilizes a stream of hot flue gas as a source of enthalpy. The flue gas is generally formed by combusting natural gas, coal or oil. The flue gas temperature is controlled to provide the optimum economy and product quality, and may be as high as 2400 degrees F. or more.

In some processes, especially those where indirect heat exchange is used, a high heat transfer rate can be obtained only if the flue gas exits the process at an elevated temperature. A considerable quantity of the enthalpy is thus wasted. At the same time, the resistance to heat transfer limits the throughput of the system. In chemical processes where the reactions must be carried out at temperatures considerably lower than the maximum flue gas temperature, a further limitation is placed upon the flue gas temperature which may be used.

In the calcination conversion of gypsum dihydrate, i.e. $CaSO_4 \cdot 2H_2O$, to hemihydrate calcium sulfate, $CaSO_4 \cdot \frac{1}{2}H_2O$, or to anhydrous calcium sulfate, $CaSO_4$, the hot flue gas may be introduced into the calcination kettle to directly heat the hydrate. In the generally preferred method, however, the heat exchange is conducted indirectly, and hot flue gas does not contact the solids at all. The water of hydration driven off from the solids is discharged from the kettle as a stream separate from the partially cooled flue gases.

Calcination of gypsum to hemihydrate calcium sulfate occurs at temperatures somewhat greater than the normal boiling point of water. However, satisfying the large thermal requirement, i.e. about 500,000 BTU per ton of calcium sulfate hemihydrate produced, necessitates rapid heat transfer to achieve the desired economy. Flue gases at temperatures as high as about 900-2000 degrees F. are used. Higher temperatures may result in deleterious "dead burning", i.e. the conversion of a portion of the gypsum to insoluble calcium sulfate anhydrite. In practice, the temperature and solids residence time in the calcination vessel are controlled to achieve the desired water of hydration without "dead burning" any substantial amount of the calcium sulfate.

Boiling in the calcination vessel typically produces fluidization of the solids. The mixing characteristics in the vessel may approach that of perfect mixing, resulting in nearly uniform temperatures throughout the vessel. The temperature difference across the heat exchange wall will drop as the hot vapor passes from the hot vapor inlet to the vapor outlet. As a result, only a portion of the available enthalpy in the hot vapors are extracted in the calcination vessel. The cooled vapor will be relatively hot, typically about 500-900 degrees F., as it leaves the vessel, and further heat recovery is required before discharge to avoid large heat losses.

SUMMARY OF THE INVENTION

The invention pertains to a thermal processor where heat is supplied by a hot vapor, e.g. flue gas, to heat particulate solids which are fed to the processor from a conveyor. The conveyor may be a screw conveyor, belt or chain conveyor, or a pneumatic conveyor. The conveyor must be closed so that pressurized vapors or gases may be conducted through it with minimal leakage.

In its broad sense, the invention is an improvement in a thermal treatment process. In the process, a solid material is introduced into a closed continuous conveyor to be transported to a thermal processor. In the processor, the solid material is subjected to heat transfer from a hot vapor or gas. The solid material is heated, and the hot vapor is cooled to an intermediate temperature. The improvement comprises directing a portion or all of the cooled vapor, at the intermediate temperature, to the conveyor. The cooled vapor contacts and preheats the solid material which is being transported through the conveyor, and the incoming solid material enters the thermal processor at an elevated temperature. The further cooled vapors are discharged to a subsequent process or to the atmosphere. In the preferred embodiment, the cooled vapor is pressurized to a slight overpressure for passage through the conveyor.

The preheating of the solids in accordance with this invention results in increased capacity of the thermal processing system, without the addition of conventional heat exchangers or thermal processing vessels. In addition, thermal energy which may otherwise be wasted is utilized.

When the solids to be processed are particulate in nature, the hot vapors are preferably passed through the conveyor at a velocity which induces fluidization. The overall heat transfer rate is thus increased, and the heat is more uniformly transferred to all of the solid particles. The capacity of the system is increased. In addition, the mixing caused by fluidization results in greater homogeneity of particle size distribution. This effect is particularly pronounced in screw conveyors. A more uniform size distribution in the feed to the calcining kettle produces a more uniform product.

The invention is advantageously applied to a process for continuously calcining materials such as gypsum or lime materials. For example, the calcination of gypsum, i.e. calcium sulfate dihydrate, to calcium sulfate hemihydrate takes place with the loss of 1.5 moles of water of hydration per mole of gypsum. Present processes may discharge the flue gas from the calcination kettle at 800 degrees F. or even higher temperatures, wasting a large quantity of heat to the atmosphere. The invention is most useful where the cooled flue gas enters the conveyor at a temperature of at least 500° F.

DESCRIPTION OF THE PREFERRED EMBODIMENTS

Figure 1:
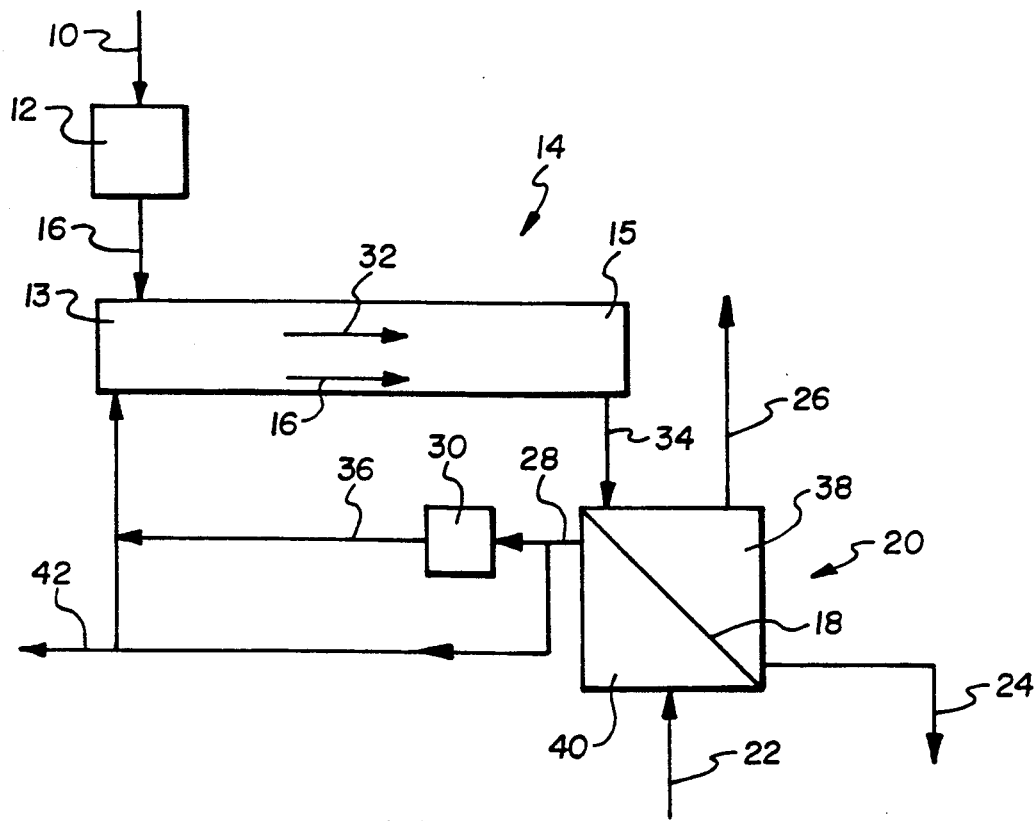
FIG. 1 is a flow diagram illustrating the invention.

As shown in the block diagram of FIG. 1, a solid material 10 in particulate form is passed through a gas barrier means 12 such as a rotary lock device, and then to the inlet end 13 of conveyor 14 as metered solid material 16. The solid material 16 is moved from the inlet end 13 to the outlet end 15 of the conveyor 14 and introduced into thermal processor 20. The solid material 16 is subjected to indirect heat exchange in the processor 20 from a stream 22 of hot gas, and is heated and processed in accordance with the particular objective of the thermal process.

The stream 22 of hot gas used in the thermal processor may be a stream from another process, or may be separately generated by combustion of a fuel such as coat, oil or natural gas. The hot gas will generally contain some superheated water vapor.

The thermal processor may be a dryer, kiln, calcining kettle, reactor vessel or other apparatus constructed to heat a solid material 16 with the enthalpy of a hot gas 22. The heat exchange may be accomplished by direct contact between hot gas and solids, or alternatively by indirect heat exchange through a barrier 18 separating the hot gas from the solids. FIG. 1 illustrates the process wherein indirect heat exchange is utilized in the thermal processor 20.

Processed solids 24 are discharged from the thermal processor 20. Water vapor, carbon dioxide or other gaseous or liquid constituent resulting from the treatment of the solid material 16 is discharged from the thermal processor as stream 26. In cases where the chemical process occurs without evolution of any such materials, there may be no stream 26.

The stream 22 of hot gas, cooled to an intermediate temperature by passage through the thermal processor 20, exits the processor 20 as cooled gas stream 28. If the pressure of cooled gas stream 28 is sufficiently high, a portion or all of the gas may be directed without further pressurization to the inlet end 13 of the conveyor 14. The gas passes cocurrently with solid material 16 through conveyor 14 as stream 32, and the combined stream is discharged through chute 34 into the thermal processor 20. The stream 32 of gas, cooled but yet at an elevated intermediate temperature, preheats the solid material 16 in the conveyor 14 by convection and conduction to relieve the heating load applied to the thermal processor 20. The gas barrier means 12 ensures that most or all of the cooled gas stream 32 passes through the length of the conveyor. Preferably, the cooled gas stream 32 is introduced into the conveyor 14 at a location upstream from the solids, so that the entire stream 16 of conveyed solids in the conveyor is contacted with the gases.

In a preferred form of the invention, the stream 32 of cooled gases is passed through the conveyor 14 at a velocity which fluidizes the solid material 16. The solid particles are entrained in the turbulent gas flow to provide intimate contact therebetween. Such fluidization greatly increases the convective and conductive heat transfer rates and subjects the solid material 16 to a more uniform heating.

It may be necessary to pressurize gas stream 28 to achieve the desired fluidization and heat transfer in the conveyor 14. A fan or other pressurizing means 30 compresses the stream 32 of cooled gases to produce a gas stream 36 at an elevated pressure, for example, 30 inches water column above the pressure in the solids processing side 38 of the thermal processor, into which chute 34 discharges. In the embodiment of FIG. 1, the required pressure of gas stream 36 will depend upon the velocity and pressure drop in the conveyor 14 required to achieve the desired heat transfer and/or fluidization.

The pressure drop between the hot gas side 40 and the solids processing side 38 of the thermal processor equals the pressure drop across the conveyor 14 plus the fan-induced pressure rise, plus friction losses in the intervening conduits and any flow control devices.

In some cases it may be desirable to direct only a portion of the stream 28 or 36 of cooled gas to the conveyor 14. Sidestream(s) 42 may be directed from the cooled gas stream, either before and/or after pressurization, to other process steps or by discharge to the atmosphere. The sidestream portion 42 may be drawn off either before or after pressurization, but the former will generally result in a smaller required capacity of pressurization means 30.

The increase in production throughput is dependent upon the particular thermodynamic and stoichiometric conditions, as well as the type and physical dimensions of the conveyor 14. In some applications, the net increase in solids throughput may exceed 10-15 percent.

Figure 2:
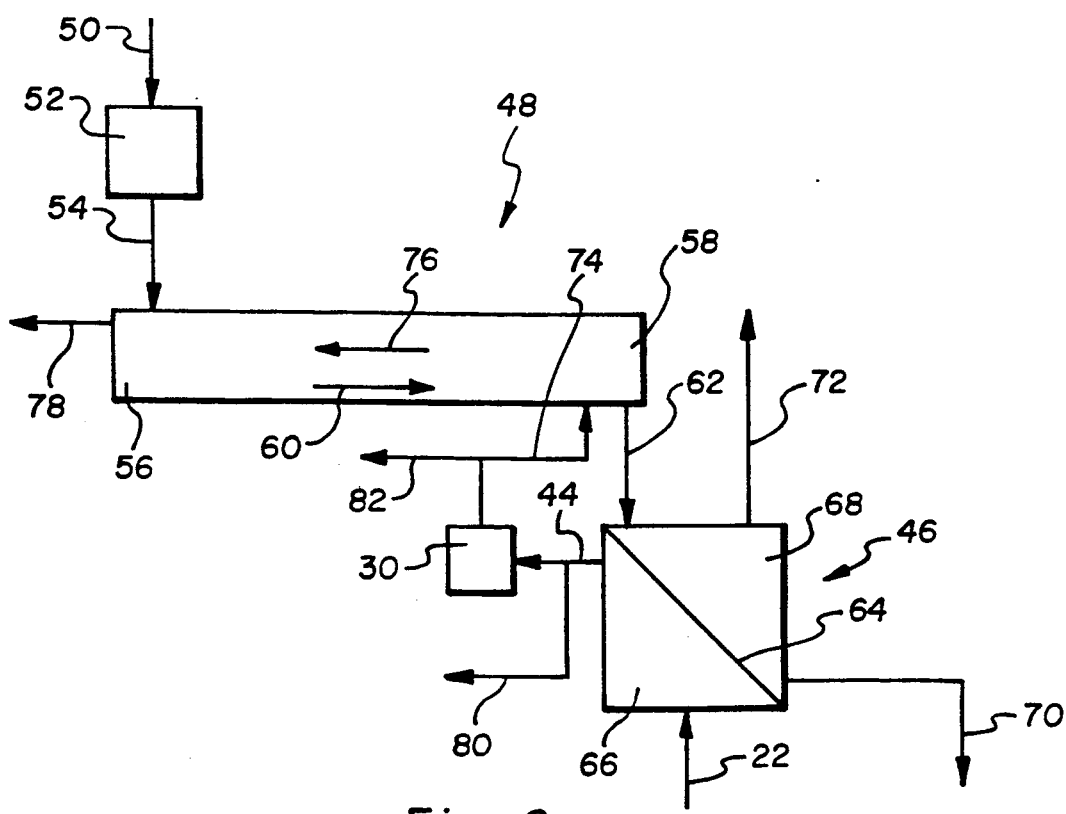
FIG. 2 is a flow diagram illustrating another embodiment of the invention.

Turning now to FIG. 2, another configuration of the invention is shown, in which a portion or all of the stream 44 of intermediate temperature cooled gas from the thermal processor 46 is passed through the conveyor 48 in countercurrent flow with the flow of solids 60. In this case, the solids 60 are not to any substantial degree fluidized by the stream 44 of cooled gas.

The process may be characterized as follows: Solid material 50 in conveyable form is passed through a gas barrier means 52 such as a rotary lock device and is then depicted as becoming stream 54 of solid material which is passed into the inlet end 56 of the conveyor 48 to become a stream 60 of solids which is conveyed to the outlet end 58 of the conveyor 48. The stream 60 of solids is then discharged through chute 62 into the thermal processor 46. As in the embodiment of FIG. 1, the thermal processor 46 in this embodiment is constructed to provide substantial or complete separation of hot gas 22 from the solids being thermally treated. This separation is represented by barrier 64 across which heat transfer from hot gas 22 in hot gas side 66 to solids 60 in solids processing side 68 occurs. Processed solids 70 exit the processor 46, as does a stream 72 of offgas, if any is generated.

All or part of cooled gas stream 44 from the thermal processor 46 is pressurized, when necessary, by pressurizing means, e.g. a fan, and directed as pressurized cooled gas 74 to the outlet end 58 of conveyor 48. The gas 74 then is passed as pressurized heating gas stream 76 in countercurrent contacting flow with solids stream 60 and discharged from the inlet end 56 of the conveyor 48 as stream 78 of further cooled gas. In general, this embodiment is most useful where the solids are essentially non-fluidizing at the gas velocities in the conveyor. In applications where a significant quantity of the solids 60 is entrained by the gas stream 76 and exit in the further cooled gas stream 78, a solids/gas separator such as an ordinary cyclone separator, not shown, may be used to recover the solids from the gas stream 78 for recycling into the thermal processor for example.

In applications where a portion of the solids 60 in the conveyor may be entrained in the cooled gas 44, it may be desirable to reduce the velocity of gas 76 in the conveyor to a level where entrainment is avoided or minimized. The velocity may be reduced by drawing off a portion 80 of the cooled gas 44 prior to pressurization or a portion 82 of the cooled pressurized gas 74. The gas 80 and/or 82 which is drawn off may be used for other purposes or discharged to the atmosphere.

Figure 3:
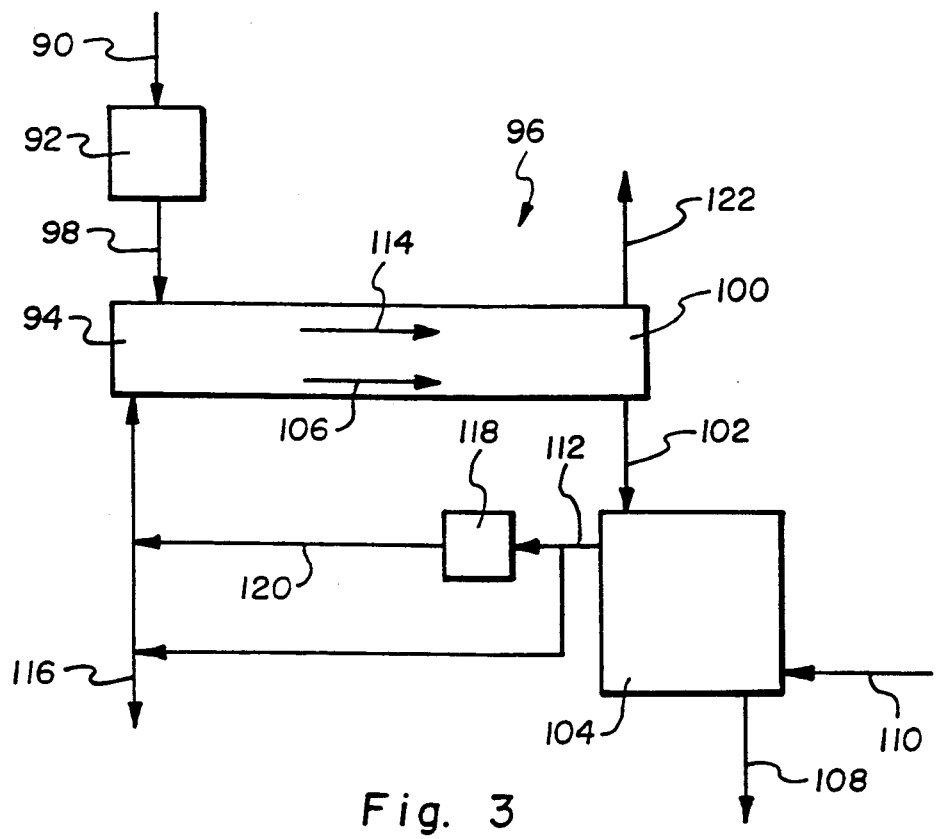
FIG. 3 is a flow diagram illustrating a further embodiment of the invention.
Figure 4:
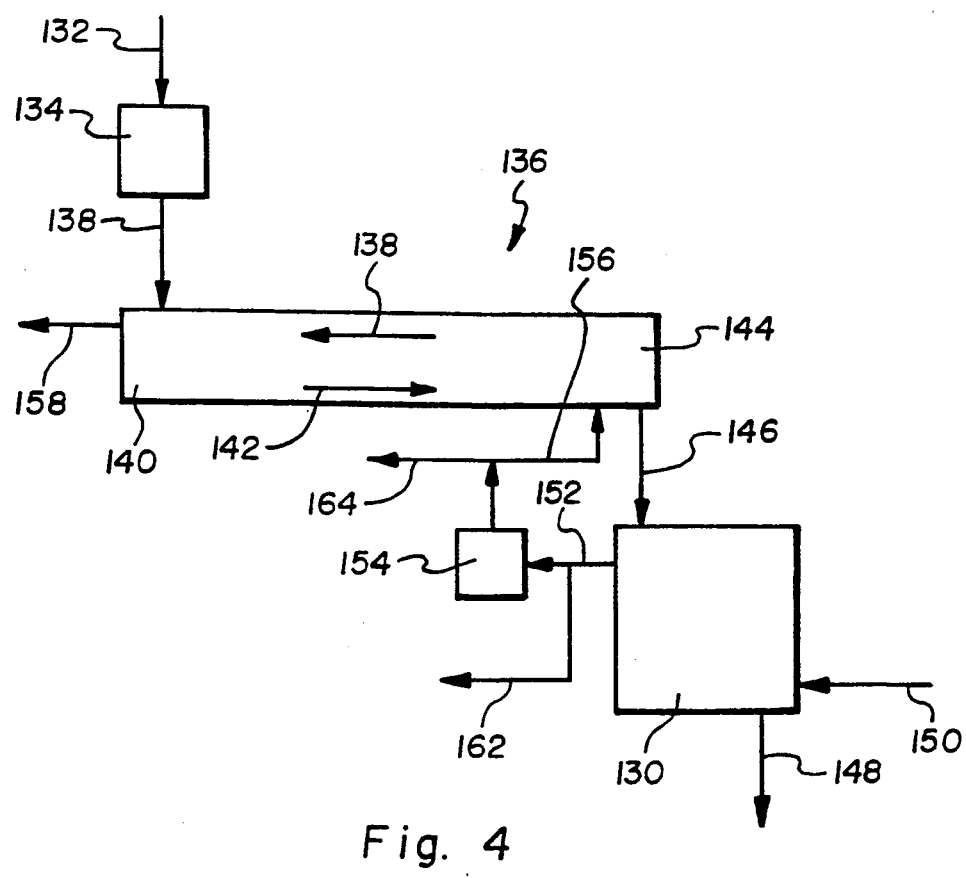
FIG. 4 is a flow diagram illustrating a still further embodiment of the invention.

FIGS. 3 and 4 depict the application of the invention to situations where the thermal processor is operated with direct contact heat exchange between hot gas and solids. An exemplary process is the conversion of limestone, i.e. $CaCO_3$ to quicklime, i.e. CaO, in which $CO_2$ is evolved.

As shown in FIG. 3, a solid material 90 is passed through a gas barrier means 92 such as a rotary lock device, and then to the inlet end 94 of closed conveyor 96 as metered solid material 98. Solid material 98 entering the conveyor is transported and preheated as conveyed solids stream 106 to the outlet end 100 of the conveyor and discharged through chute 102 into the thermal processor 104. Following treatment in the thermal processor 104, the solid material is discharged as processed solids 108.

In this mode of operation, it is desirable to limit the quantity of gas passing with the solids from the conveyor 96 to the thermal processor 104, or vice versa. Means known in the art for limiting such flow may be used.

A stream 110 of hot gas is introduced into the thermal processor 104 for direct contact heat exchange with the solid material undergoing thermal processing. The hot gas is cooled in the process to an intermediate temperature and exits the thermal processor 104 as cooled gas stream 112. If the pressure of this stream is sufficient to achieve the desired velocity of gas 114 in the conveyor 96, gas stream 112 may be directly introduced into the inlet end 94 for cocurrent passage with the stream 106 of solid material, which it preheats. The excess portion 116 of gas stream 112 is then drawn off for use elsewhere in the plant or is discharged to the atmosphere, for example.

If the pressure of cooled gas stream 112 is insufficient to achieve the desired velocity in the conveyor 96, a portion or all of the cooled gas stream 112 may be compressed with a pressurizing means 118 such as a fan to produce a pressurized cooled gas stream 120. A portion of the cooled gas stream 112 or pressurized cooled gas stream 120 may be drawn off as the excess portion 116 of the process gas.

Concurrent passage of solids stream 106 and gas stream 114 through the conveyor 96 results in transfer of enthalpy from the gas to the solids to preheat the solids. The further cooled gas leaves the outlet end 100 of the conveyor 96, either to enter the thermal processor 104 as a recycle stream with the conveyed solids 106, or in a separate stream 122 to be used elsewhere or discharged to the atmosphere, for example. The latter is preferred in order to maintain the temperature of the cooled gas 112 as high as possible. A separation means, not shown, may be used to recover entrained solids from the gas stream 122 and return them to the thermal processor 96. The separation means may be a centrifugal separator or other solids-gas separation device known in the art.

FIG. 4 shows the invention applied in the countercurrent mode to a system having a thermal processor 130 with direct contact heat exchange between gas and solids.

Solid material 132 to be treated is passed through a gas barrier means 134 as previously described, and introduced into the inlet end 140 of a closed conveyor 136 as solids stream 138. The solids are transported in conveyed solids stream 142 to the outlet end 144 of the conveyor 136, and discharged via chute or other closed solids conducting means 146 to the thermal processor 130. Following processing at an elevated temperature in the thermal processor 130, the stream 148 of processed solid material is discharged.

Hot gas stream 150 is introduced into the thermal processor 130 for heating by direct contact heat exchange the solids stream 142 passing therethrough. The gas stream 150 is cooled to an intermediate temperature by this passage, and is thereafter passed from the thermal processor as cooled gas stream 152. If its pressure is sufficient to achieve the desired velocity in the conveyor 136, a portion or all of the cooled gas stream 152 is passed directly to the outlet end 144 of the conveyor 136. Alternatively, it may be passed to a pressurizing means 154 such as a fan for pressurization before introduction into the conveyor as pressurized cooled gas stream 156. This stream of gas passes through the conveyor 136 as conveyed gas stream 138 in a direction countercurrent to the solids stream 142, and is discharged from the inlet end 140 of the conveyor 136 as further cooled gas stream 158. Stream 158 may be used in another process, not indicated, or may be discharged to the atmosphere. A portion of the cooled gas stream 152 may be drawn off as a gas sidestream 162 and/or a pressurized gas sidestream 164. Stream 162 and/or 164 may be used in another process or discharged to the atmosphere.

The invention may be applied to any closed stationary conveying means which transports solids from one location to a thermal processing means heated by a hot gas. By "closed" is meant that a hot gas can be passed in confined flow through the apparatus in intimate contact with the solids, without substantial leakage to the atmosphere. The preferred conveyor is an enclosed helical screw conveyor such as is well known in the art. Alternatively, the invention may be used with enclosed belt or chain conveyors, or other such enclosed conveyors of the art. Pneumatic conveyors may be utilized. In this case, the hot gas is the conveying medium, and is passed at the required high velocity to keep the solid particles suspended in the gas.

Figure 5:
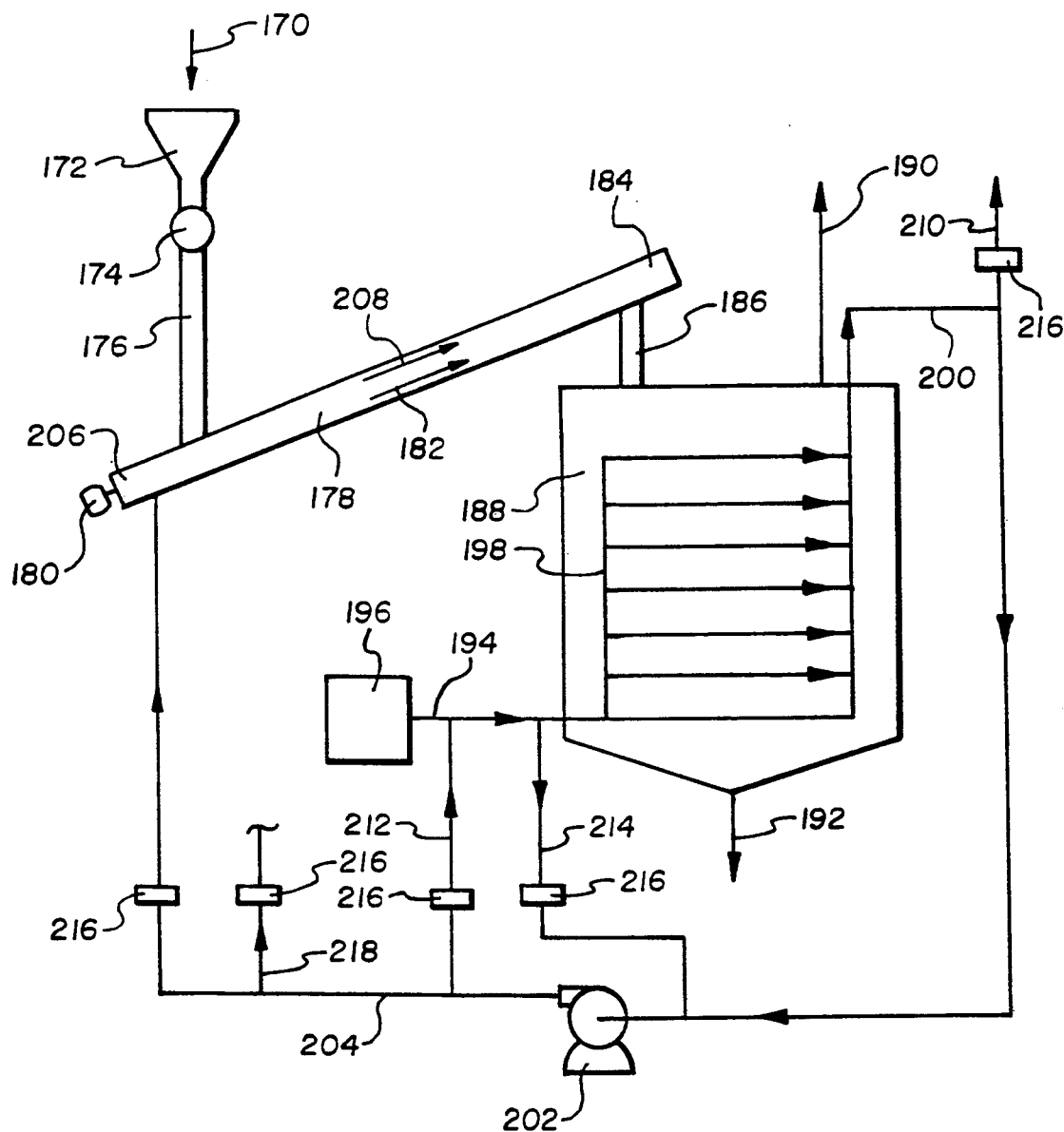
FIG. 5 is a flow diagram illustrating the invention in a continuous calcining process.

An application of the invention to a calcining process is illustrated in FIG. 5. In this Figure, raw gypsum 170 is introduced into hopper 172 which feeds rotary lock 174. Backflow of gas is thus substantially avoided. The gypsum 170 passes through conduit 176 into an enclosed helical screw conveyor 178 powered by motor 180. The conveyed stream 182 of raw gypsum is transported upwardly to the outlet end 184 of the conveyor, and discharged via chute 186 into a calcination kettle 188 wherein thermal processing takes place. A portion of the water of hydration is driven off at the elevated temperature in the kettle 188, and is discharged as water vapor stream 190. The kettle temperature and residence time are closely controlled so that the product stream 192 discharged from the kettle is essentially pure hemihydrate calcium sulfate, i.e. no or very little anhydrite calcium sulfate is formed.

The evolution of water vapor in the kettle results in vigorous fluidization of the solids, and a well-mixed flow regime is maintained.

A hot flue gas 194 is produced in a furnace 196 by fuel combustion and passed into enclosed heat transfer surfaces 198 within the kettle 188. Thermal energy is transferred indirectly across the heat transfer surfaces to the fluidized solids, to heat the solids and water vapor. The cooled gas stream 200 leaves the kettle 188 at an intermediate temperature, and all or a portion of the stream 200 is conducted to fan 202 which pressurizes the cooled gas to form a pressurized cooled gas stream 204. This stream is conducted to the inlet end 206 of conveyor 178, where it is passed through the conveyor 178 as fluidizing gas stream 208 in a direction cocurrent with the solids stream 182.

A portion of cooled gas stream 200 may be diverted as stream 210 to reduce the gas velocity in the conveyor 178. In addition, a sidestream 212 of pressurized cooled gas 204 may be directed to the hot flue gas stream 194. In addition, or alternatively, a sidestream 214 of hot flue gas 194 may be directed to the cooled gas stream 200. In the first case, the temperature of the hot gas 194 in the kettle will be reduced. In the second case, the temperature of the cooled gas 204 passing to the conveyor 178 will be increased. Thus, the temperatures in both the conveyor and calcination kettle may be readily controlled. Dampers 216 or other flow control means may be used to regulate the flows of gas for controlling the temperatures and fluidization. If necessary, a portion 218 of cooled gas stream 204 may be diverted to another use or vented to the atmosphere.

The screw conveyor is particularly advantageously used with this invention. In this type of conveyor, the solid particles are turned over by the screw motion, continually exposing new solids particles to the moving gas flow. In addition, the constricted helical flow path of the gas increases its velocity to enhance fluidization of the solids. The result is a fluidized particle stream having enhanced homogeneity with respect to particle size distribution. Also, the rate of heat transfer is particularly increased when the gas velocity is sufficient to fluidize the solids.

EXAMPLE

In a production scale calcining process represented by FIG. 5, raw gypsum containing 6 percent free moisture was calcined to calcium sulfate hemihydrate in a standard calcination kettle 188. Thermal energy was supplied by indirect heat transfer from a hot gas 194 produced by combusting natural gas in the presence of air. The hot gas temperature entering the calcination kettle was about 2100 degrees F., and the cooled gas 200 leaving the kettle had a temperature of 812 degrees F. In the standard configuration, the cooled gas was discharged to another process for recovery of a portion of its enthalpy.

The calcination kettle was fed by a standard 12 inch diameter helical screw conveyor 178 having a total solids travel length of 20 feet and having a conveyor housing of 13 inches inside diameter. The screw was operated at a speed of about 70 rpm.

The conveyor was fed from a hopper 172 by a feeding device which included a rotary lock 174 to meter the raw gypsum 170 into the conveyor and prevent vapors and gases from backing up into the hopper. The gypsum was metered into the calcination kettle 188 at a rate which resulted in a hemihydrate product temperature of 320 degrees F. At this outlet temperature, the product is nearly pure hemihydrate, very little of the gypsum having been "burned" to the anhydrite form. The water vapor from calcination was discharged from the kettle at about 300 degrees F.

In the control mode, the production rate of calcium sulfate hemihydrate was 16.9 tons per hour.

The calcination system was modified so that cooled gas 200 from the calcination kettle 188 could alternatively be passed to a fan 202 for pressurization to about 30 inches of water and then directed to the inlet end 206 of the screw conveyor 178 for cocurrent fluidizing transport with the particulate gypsum.

In the test mode, the solids residence time in the fluidized screw conveyor was calculated to be 20 seconds, and in the calcination kettle, about 1.5 hours. The cooled gas was passed through the conveyor at a velocity of about 5500 feet per minute. The temperature rise of the solids from conveyor inlet to outlet was about 50 degrees F.

In the test mode, using the present invention, the production rate was 24.0 tons per hour, a substantial increase of 12.4 percent over the control mode.

Reference herein to details of the illustrated embodiments of the invention is not intended to restrict the scope of the appended claims which themselves recite the features regarded as important to the invention.

What is claimed is:

1. A continuous calcining apparatus comprising:
    a closed calcination vessel having heat exchange means therein for continuously indirectly heating and calcining a granular hydrated feed material passed therethrough at a calcination pressure, said vessel having a feed material inlet and a calcined material outlet and a calcination vapor outlet;
    means for passing a stream of heated vapors through said heat exchange means in said calcination vessel to indirectly heat and calcine said hydrated material, said heated vapors being cooled to an intermediate temperature by heat exchange with said hydrated material in said vessel;
    conveyor means consisting of one of a helical screw conveyor and a belt conveyor for transporting a stream of said hydrated material to said vessel, said conveyor being contained in an enclosure with an inlet end for introducing feed material thereto and an outlet end connected to the feed material end of the closed calcination vessel for passing said feed material to said calcination vessel feed material inlet;
    first conduit means for directing said cooled vapors from said heat exchange means;
    pressurizing means having an inlet connected to said first conduit means for receiving and compressing said cooled vapors to be discharged at a pressure less than about 30 inches water column above said calcination pressure and a velocity sufficient to assist in the conveying of said feed materials in the conveyor enclosure;
    second conduit means for receiving said compressed cooled vapors and directing said compressed cooled vapors to the inlet end of said enclosure for passage through said enclosure to contact and preheat and assist in the conveying of said feed material therein, wherein said cooled vapors are further cooled;
    means for discharging a combined stream of said further cooled vapors and said preheated feed material from said enclosure of sid conveyor into calcination vessel and discharging said further cooled vapors from the calcination vessel through the calcination vapor outlet.
    means for controlling the flow rate of said cooled vapors to said conveyor enclosure for contacting, preheating and fluidizing said feed material during conveyance to said calcination vessel;
    means for selectively discharging a portion of the flow through the second conduit means to the means for passing a stream of heated vapors through the heat exchanged means in said calcination vessel; and
means for selectively discharging a portion of the heated vapors from the means for passing a stream of heated vapors through the heat exchange means in said calcination vessel to said first conduit means.

* * * * *